United States Patent [19]
Peppel

[11] Patent Number: 5,053,940
[45] Date of Patent: Oct. 1, 1991

[54] EXTINCTION BLOCKING FOR GTOS

[75] Inventor: Michael Peppel, Weinheim, Fed. Rep. of Germany

[73] Assignee: Asea Brown Boveri Aktiengesellschaft, Mannheim, Fed. Rep. of Germany

[21] Appl. No.: 579,047

[22] Filed: Sep. 7, 1990

[30] Foreign Application Priority Data

Sep. 8, 1989 [DE] Fed. Rep. of Germany ....... 3929861
Oct. 12, 1989 [DE] Fed. Rep. of Germany ....... 3934044

[51] Int. Cl.$^5$ .............................................. H02N 7/122
[52] U.S. Cl. ........................................ 363/58; 363/96; 363/137
[58] Field of Search ............... 363/56, 57, 58, 96, 363/135, 136, 137

[56] References Cited

U.S. PATENT DOCUMENTS

| | | | |
|---|---|---|---|
| 4,597,038 | 6/1986 | Stacey | 363/57 |
| 4,641,231 | 2/1987 | Walker et al. | 363/137 |
| 4,672,525 | 6/1987 | Horie et al. | 363/136 |
| 4,682,278 | 7/1987 | Marquardt et al. | 363/56 |
| 4,775,925 | 10/1988 | Lezan et al. | 363/58 |
| 4,920,473 | 4/1990 | Frankenberg et al. | 363/96 |

FOREIGN PATENT DOCUMENTS

3727996 3/1989 Fed. Rep. of Germany .

Primary Examiner—Steven L. Stephan
Assistant Examiner—Jeffrey L. Sterrett
Attorney, Agent, or Firm—Herbert L. Lerner; Laurence A. Greenberg

[57] ABSTRACT

In a method and device, extinction blocking signals for gate-turn-off power semiconductors, particularly GTO thyristors, are formed in static converters in order to suppress unacceptable extinction attempts and to protect the power semiconductors against destruction. An extinction blocking signal is emitted when the sum of the actual load current of one phase of the converter and the product of the derivation with respect to time of the load current and the maximum storage time of one power semiconductor is greater than the maximum periodically interruptible anode current of one power semiconductor. Furthermore, an extinction blocking signal is emitted when the derivation of a branch current of the converter with respect to time exceeds a threshold value proportional to the voltage supplied to the converter and a short-circuit of the converter is therefore present.

26 Claims, 5 Drawing Sheets

EXTINCTION BLOCKING FOR GTOS

BACKGROUND OF THE INVENTION

1. Field of the Invention

The invention relates to a method and a device for forming an extinction blocking signal for gate-turn-off power semiconductors in static converters, for suppressing unacceptable extinction attempts.

For example, an application of the invention is possible in the case of GTO pulse-controlled inverters for traction drives.

2. Description of the Related Art

Such a method is known from German Published, Non-Prosecuted Application DE-OS 37 27 996. The method described therein for suppressing unacceptable extinction attempts in gate-turn-off power semiconductors in static converters, is characterized by the fact that a measurement quantity composed of the actual anode current or load current of the semiconductor and the product of the derivation of the actual anode current with respect to time and the maximum turn-off delay time is formed and compared with an adjustable maximally switchable anode current. In that method extinction commands that occur are suppressed when the measurement quantity being formed reaches or exceeds the maximally switchable anode current.

GTO thyristors are gate-turn-off power semiconductors for very high powers. They can turn off currents below a limit value ITQ (which is a periodically interruptible anode current of a GTO thyristor) but can conduct very much higher currents without difficulties if no turn-off attempt is made. It is therefore logical to block the turning-off of GTO thyristors when the GTO current exceeds the limit value ITQ.

A GTO thyristor interrupts the current only at certain time after the turn-off command, which is the so-called storage time. During the storage time, the anode current of the GTO thyristor can continue to rise. The method of the predictive, extinction block according to German Published, Non-Prosecuted Application DE-OS 37 27 996 therefore predicts the current to be expected at the instant when the GTO thyristor is turned off, from the actual GTO current and its actual current rise (di/dt) during the storage time, and compares it with ITQ.

Instead of the GTO current, the load current of the static converter can be used in the known method since that is measured in any case for control purposes and in most cases it only differs little from the GTO current. In contrast, the di/dt values of the GTO currents are measured individually for each GTO thyristor by means of sensing coils (current rise sensing devices).

In order to avoid interfering parasitic inductances, the di/dt sensing coils can only be installed in such a manner as to exposed them to the currents of the protection networks of the GTO thyristors. The protection networks are LC structures (wherein L is inductance and C is capacitance) which oscillate with more or less intensity depending on the circuit of the power section being used. Since the di/dt sensing coils also measure the snubber currents in the known method, errors in the formation of the extinction blocking signal can occur in practice because of the high di/dt values of the snubber oscillations.

If the di/dt value of the snubber current acts in the same direction as that of the GTO current, the extinction block is wrongly and unnecessarily triggered. Such mistriggerings must be subsequently filtered again at the level of signal processing. If the di/dt value of the snubber current opposes that of the GTO current, the extinction block is based on too small a di/dt value and may therefore not trigger even though that would be required. The consequence is a risk of destruction of the GTO thyristor concerned.

It is accordingly an object of the invention to provide a method and a device for forming an extinction blocking signal for gate-turn-off power semiconductors, which overcome the hereinafore-mentioned disadvantages of the heretofore-known methods and devices of this general type and which operate in a simple manner to ensure a maximum utilization without risk of destruction for the power semiconductors and largely avoid functional disturbances due to snubber currents in protection networks for the power semiconductors.

SUMMARY OF THE INVENTION

With the foregoing and other objects in view there is provided, in accordance with the invention, a method for forming an extinction blocking signal for gate-turn-off power semiconductors in static converters for suppressing unacceptable extinction attempts, which comprises emitting an extinction blocking signal when the sum of the actual load current of one phase of the static converter and the product of the derivation of the load current with respect to time and the maximum storage time of one power semiconductor is greater than the maximum periodically interruptible anode current of one power semiconductor.

In accordance with another mode of the invention, there is provided a method which comprises forming the amount of the sum.

In accordance with a further mode of the invention, there is provided a method which comprises inverting the sum in the case of load currents having a direction of flow from a load to the converter.

In accordance with an added mode of the invention, there is provided a method which comprises feeding a single extinction blocking signal to two power semiconductors of one bridge phase of a converter in a bridge circuit.

In accordance with an additional mode of the invention, there is provided a method which comprises emitting an extinction blocking signal when the derivation of a branch current of the converter with respect to time exceeds a threshold value proportional to the voltage supplied to the converter and a short circuit of the converter is therefore present.

In accordance with yet another mode of the invention, there is provided a method which comprises making the threshold value inversely proportional to the total commutation inductance of one phase of the converter.

In accordance with yet a further mode of the invention, there is provided a method which comprises utilizing a limit value formed from machine characteristics of a load as a derivation of the load current with respect to time.

In accordance with a concomitant mode of the invention, there is provided a method which comprises emitting an extinction blocking signal when the derivation of the load current with respect to time exceeds another limit value, and the other limit value is greater than the first-mentioned limit value and lower than a threshold value relevant to the short-circuit protection.

With the objects of the invention in view, there is also provided a device for forming an extinction blocking signal for gate-turn-off power semiconductors in static converters for suppressing unacceptable extinction attempts, comprising a current rise sensing device for a branch current, a voltage sensing device for measuring a link circuit direct voltage, an arithmetic unit connected to the voltage sensing device, and a comparator connected to the current rise sensing device and the arithmetic unit for emitting a short-circuit message when the current rise measurement value exceeds the link circuit direct voltage weighted inversely proportionally to a commutation inductance by the arithmetic unit.

In accordance with another feature of the invention, the converter has a three-phase bridge circuit, and there are provided two additional current rise sensing devices, only one of the current rise sensing devices being provided in each of the phases.

In accordance with a further feature of the invention, the single phase or each phase of the converter includes a current sensing device for measuring a load current measurement value, and another or second comparator connected to the current sensing device for emitting a predictive extinction block when the sum of the load current measurement value and the product of the corresponding load current rise measurement value with a maximum storage time of one power semi-conductor exceeds a maximum periodically interruptible anode current of one power semiconductor.

In accordance with an added feature of the invention, the single phase or each phase of the converter includes a differentiating section connected between the current sensing device and the other comparator for forming the load current rise measurement value from the load current measurement value.

In accordance with an additional feature of the invention, the single phase or each phase of the converter includes a current rise sensing device connected to the current sensing device for sensing the load current rise measurement value.

In accordance with yet another feature of the invention, the single phase or each phase of the converter includes an amount forming circuit for forming the amount of the sum.

In accordance with yet a further feature of the invention, the single phase or each phase of the converter includes an inverter connected to the current sensing device for providing the sum, and a further comparator connected to the inverter for receiving the sum and emitting a predictive extinction block.

In accordance with yet an added feature of the invention, the single phase or each phase of the converter includes an OR gate having inputs and being connected to the comparator and the other comparator for emitting an extinction blocking signal when at least one of the short-circuit message and the predictive extinction block are present at one of the inputs.

In accordance with yet an additional feature of the invention, the converter has a three-phase bridge circuit, and there is provided a current sensing device for measuring a load current measurement value, and an additional or fourth comparator connected to the current sensing device for emitting a predictive extinction block when the sum of the load current measurement value of one phase of the converter and the product of a (first) limit value and a maximum storage time of one power semiconductor exceeds a maximum periodically interruptible anode current of one power semiconductor.

In accordance with again another feature of the invention, there is provided an added or fifth comparator connected to the current sensing device for emitting a predictive extinction block when the load current rise measurement value of one phase of the converter exceeds another (second) limit value.

In accordance with a concomitant feature of the invention, the converter has a three-phase bridge circuit, two phases of the converter each include a current sensing device for measuring two load currents, and a third load current is formed from the two measured load currents.

The advantages which can be achieved by means of the invention are, in particular, in that the analog measurement values of the current rise sensing devices in the power semiconductor branches (GTO branches) do not directly contribute to the generation of the predictive extinction block and thus the interfering influences of the snubber transients (di/dt values of the snubber currents in the protection networks for the power semiconductors or GTO thyristors) are not in evidence. Due to the relatively high comparator threshold of the comparator to be used, the digitally formed short-circuit message is not significantly disturbed by snubber currents. In addition, the invention reduces the expenditure for the measurement value sensing because a single current rise sensing device is sufficient for each phase with two GTO thyristors, of a three-phase GTO inverter in a bridge circuit.

Other features which are considered as characteristic for the invention are set forth in the appended claims.

Although the invention is illustrated and described herein as embodied in a method and a device for forming an extinction blocking signal for gate-turn-off power semiconductors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
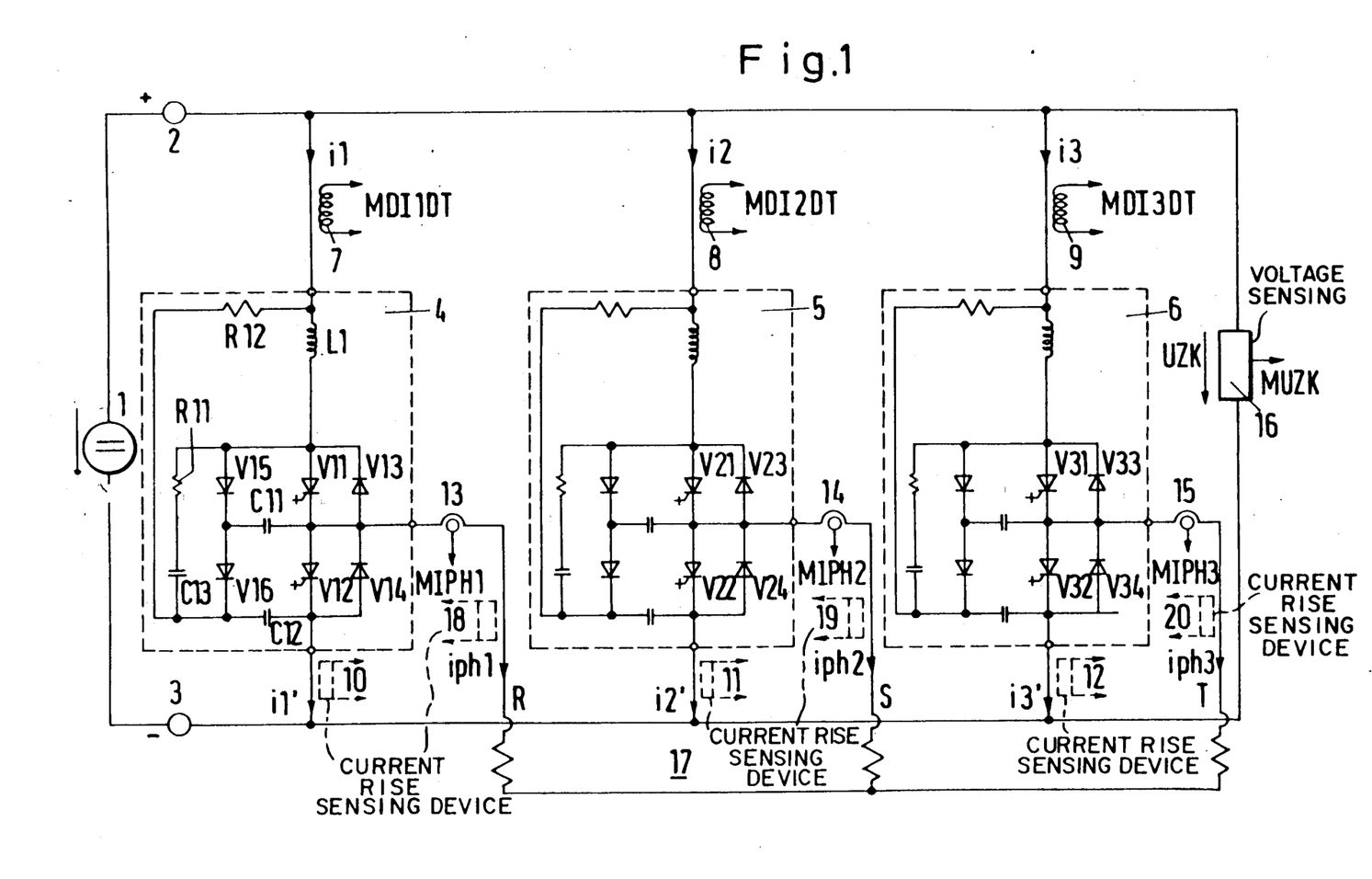
FIG. 1 is a schematic and block circuit diagram of a GTO inverter with various measuring devices for forming extinction blocking signals.

Referring now to the figures of the drawings in detail and first, particularly, to FIG. 1 thereof, there is seen a circuit diagram of a GTO inverter with various measuring devices for forming extinction blocking signals. A direct-voltage source 1 is seen between a positive terminal 2 and a negative terminal 3, to which three phases 4, 5, 6 of a three-phase GTO inverter to be operated on a direct-voltage link circuit, are connected. The GTO inverter, which is constructed in a three-phase bridge circuit, has six branches each having one respective GTO thyristor V11, V21, V31, V12, V22, V32 (which are generally gate-turn-off power semiconductors) as main valves. Each GTO thyristor is connected antiparallel to a respective diode V13, V23, V33, V14, V24, V34. The control device for firing and extinguishing the GTO thyristors is not shown in FIG. 1 for reasons of clarity.

Each phase 4, 5, 6 of the GTO inverter has a protection network being formed of a generally known configuration of diodes V15, V16..., capacitors C11, C12, C13..., resistors R11, R12,... and reactors L1..., with only the components of the protection network for phase 4 being numbered in FIG. 1 for reasons of clarity. The exact configuration of the protection networks is not significant for the understanding and the functioning of the method for forming extinction blocking signals and is only indicated by way of example in FIG. 1. The GTO inverter can also be equipped with differently constructed, generally known protection networks.

Branch currents flowing from the positive terminal 2 of the direct-voltage source 1 with a direct voltage Ud into the phases 4, 5, 6 are designated by reference symbols i1, i2, i3 and branch currents flowing from the phases 4, 5, 6 to the negative terminal 3 are designated by reference symbols i1', i2', i3'. Current rise sensing devices 7, 8, 9 are provided for sensing current rise measurement values MDI1DT, MDI2DT, MDI3DT of the branch currents i1, i2, i3. As an alternative to the devices 7, 8, 9, current rise sensing devices 10, 11, 12 can be provided for sensing current rise measurement values of the branch currents i1', i2', i3'.

The three alternating-voltage outputs of the inverter in each case act on the common junction of the two GTO branches of each phase 4, 5, 6 to form three phases R, S, T. In order to sense three load currents (phase currents) iph1, iph2, iph3 flowing at the alternating-voltage side, current sensing devices 13, 14, 15 are provided. Corresponding load current measurement values are designated by reference symbols MIPH1, MIPH2, MIPH3. In addition, current rise sensing devices 18, 19, 20 for sensing the current rise measurement values of the load currents iph1, iph2, iph3 can be, but do not have to be, provided at the three alternating-voltage outputs of the inverter. A link circuit direct voltage UZK present at the inverter is sensed with the aid of a voltage sensing device 16. A corresponding link circuit direct-voltage measurement value is designated by reference symbol MUZK.

A three-phase inductive load 17, for example an asynchronous machine used as a traction drive, is connected to the three alternating-voltage outputs of the inverter.

Figure 2:
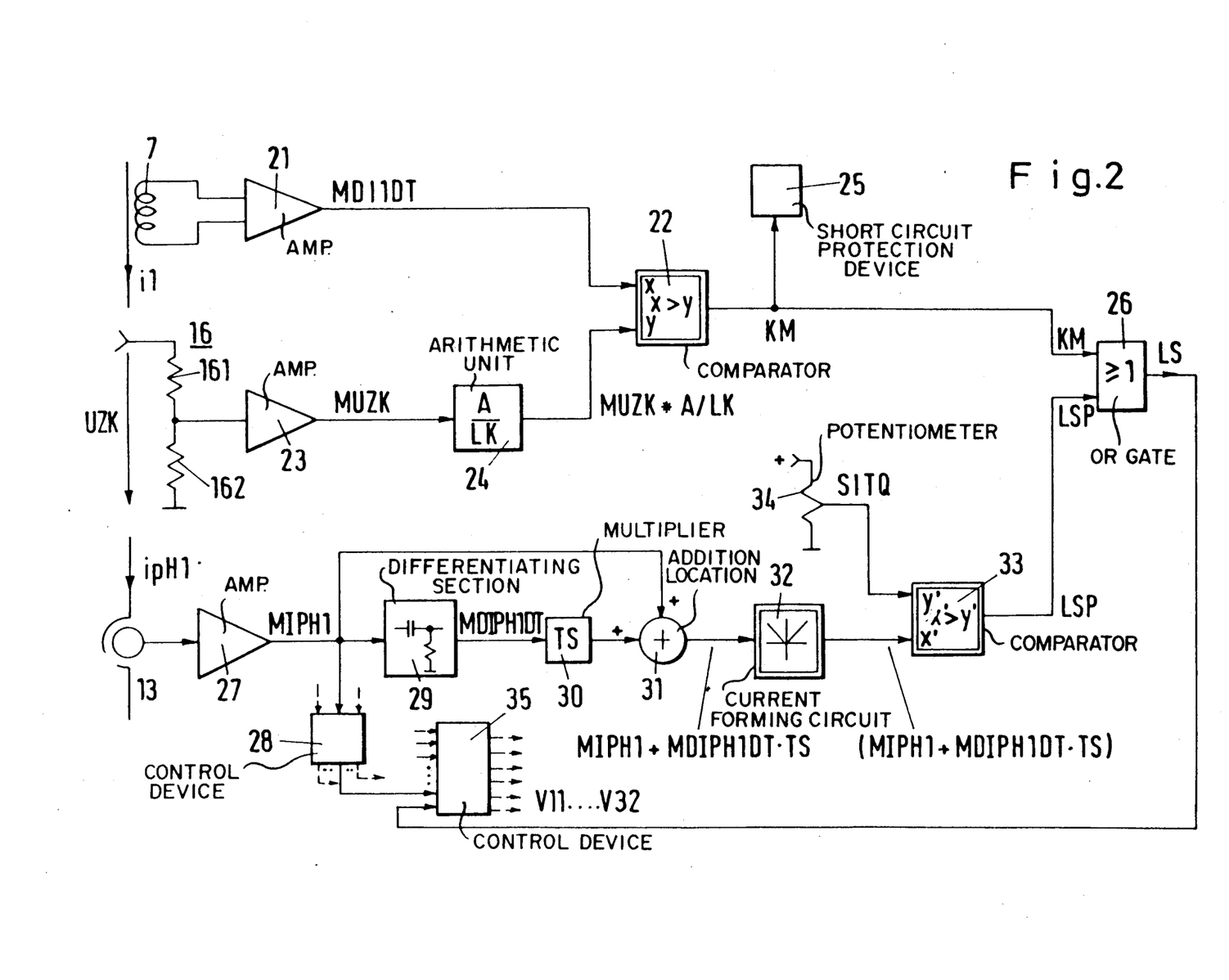
FIG. 2 is a circuit diagram of evaluating electronics for forming extinction blocking signals.

FIG. 2 shows evaluating electronics for forming extinction blocking signals. In FIG. 2, only the configuration associated with one phase, which is the phase 4 in the illustrated example, is shown by way of example. The configurations associated with the other phases are of similar construction. The current rise sensing device 7, which is connected to an amplifier 21 and is used for forming the current rise measurement value MDI1DT of the branch current i1, can be seen. The MDI1DT value is supplied to an x input of a comparator 22.

The voltage sensing device 16 for measuring the link circuit direct voltage UZK is constructed, for example, as a voltage divider (two resistors 161, 162 are disposed between the terminals 2, 3), having a voltage divider tap (which is the common junction of the two resistors 161, 162) being connected to an amplifier 23 with an output at which the link circuit direct voltage measurement value MUZK can be picked up. This value MUZK is divided by LK and multiplied by A in an arithmetic unit 24, where LK represents the total commutation inductance of one phase and A represents a predeterminable weighting factor between 0 and 1.

The factor A/LK is "calibrated into" the gain of the amplifier 23 in practice, so that the additional arithmetic unit 24 is only shown for clarification.

The expression MUZK·A/LK is present at a y input of the comparator 22. The comparator 22 emits a short-circuit message KM whenever the value of the signal present at the x input exceeds the value of the signal present at the y input, that is to say when MDI1DT is greater than MUZK·A/LK. The short-circuit message KM is fed to a short-circuit protection device 25, which is of no further interest in this connection, and to a first input of an OR gate 26.

The current sensing device 13 measuring the load current iph1 is connected to an amplifier 27. The load current measurement value MIPH1, which can be taken from the amplifier 27, is supplied to a control device 28 which is of no further interest in this connection, to a differentiating section 29 and to an addition location 31. The load current rise measurement value MDIPH1DT, which can be taken from the differentiating section 29, is multiplied by TS with the aid of a multiplier 30, wherein TS represents the maximum storage time of a GTO thyristor. In this case as well, the multiplicative constant factor TS is suitably "calibrated in" in the differentiating section 29 in practice so that the additional multiplier 30 is only shown for clarification. The addition location 31 adds the values MIPH1 and MDIPH1DT·TS and supplies the sum that is formed to an amount forming circuit 32. The amount |MIPH1+MDIPH1·TS| is present at an x' input of a comparator 33. SITQ, the maximum periodically interruptible anode current of a GTO thyristor, is applied to the y' input of the comparator 33. The limit value SITQ can be easily adjusted, such as at the tap of a potentiometer 34 connected between a positive voltage and ground or earth.

The comparator 33 delivers a predictive extinction block LSP to the second input of the OR gate 26 whenever the value of the signal present at the x' input exceeds the value of the signal present at the y' input, that is to say when |MIPH1+MDIPH1·TS| is greater than SITQ. When a short-circuit message KM or a predictive extinction block LSP is present, the OR gate 26 emits an extinction blocking signal LS to a control device 35 for firing and extinguishing the GTO thyristors, whereupon the corresponding GTO thyristors V11 and V12 are not extinguished even when corresponding extinction signals are transferred to the control device 35 from the control device 28.

FIG. 2 shows that the output of the control device 35 is connected to control connections of all of the GTO thyristors V11 ... V32 and receives input signals both from the control device 28 and from the OR gate 26 (or the other respectively OR gates) of the evaluating electronics. The control device 28 in turn receives load current measurement values MIPH1 ... MIPH3, among others, and forms the corresponding firing and extinction signals for the individual GTO thyristors therefrom.

Figure 3:
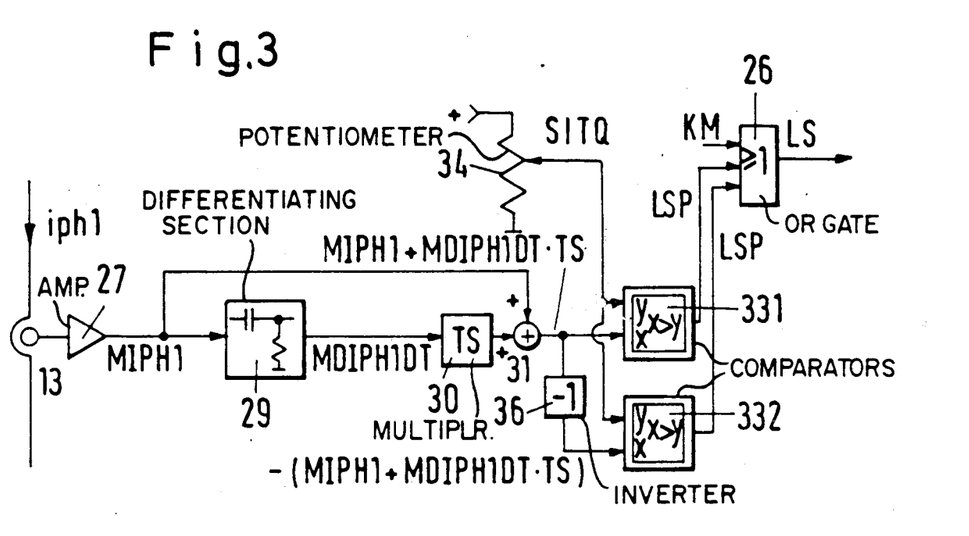
FIGS. 3, 4 and 5 are circuit diagrams of the evaluating electronics.

FIG. 3 shows a first variant of the evaluating electronics. In this variant, the formation of the amount of the sum MIPH1+MDIPH1DT·TS which is formed by the addition location 31 is omitted, that is to say the amount forming circuit 32 according to FIG. 2 is omitted. Instead, the sum MIPH1+MDIPH1DT·TS for the GTO thyristors V11, V21, V31 conducting the current from the DC link circuit to the load is supplied directly to a first comparator 331 and the sum −(MIPH1+MDIPH1DT·TS), which is inverted by an inverter 36, for the GTO thyristors V12, V22, V32 conducting the current from the load to the DC link circuit, is supplied to a second comparator 332. At the comparators 331, 332, SITQ which is the maximum periodically interruptible anode current of one GTO, in each case is present as a second input quantity. The outputs of the comparators 331, 332 feed the predictive extinction block LSP to the OR gate 26. The remaining configuration is as described for FIG. 2.

Figure 4:
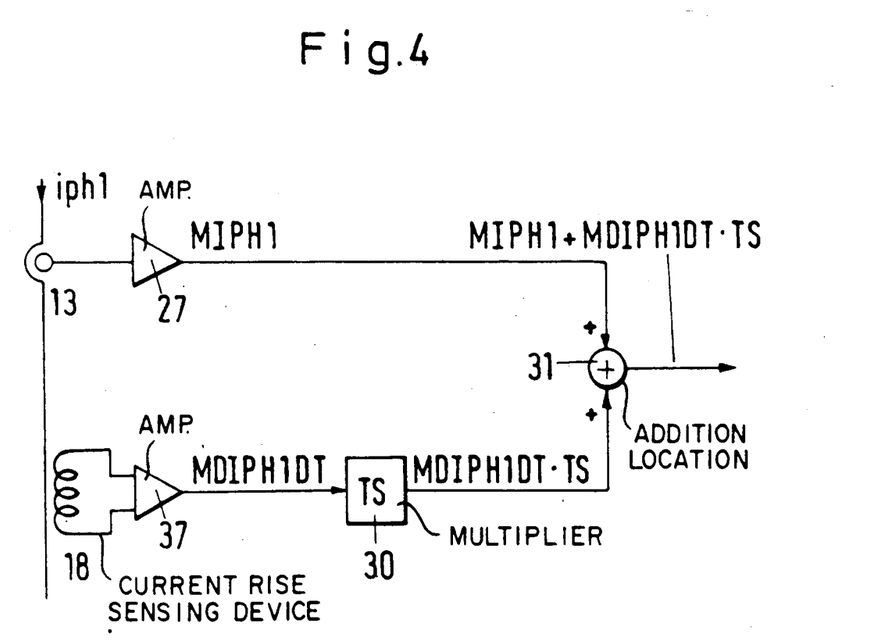

FIG. 4 shows a second variant of the evaluating electronics. In this variant, formation of the derivation of the signal MIPH1 with respect to time by the differentiating section 29 is omitted. Instead, the current rise sensing device 18, which is indicated by broken lines in FIG. 1, is used and emits the load current rise measurement value MDIPH1DT through a subsequent amplifier 37. This value, multiplied by the storage time TS, on one hand is supplied to the addition location 31, at which the load current measurement value MIPH1, formed by the configuration of the current sensing device 13 and the amplifier 27, is present on the other hand. The remaining configuration is as described at FIG. 2.

In a third variant, which is already indicated in FIG. 1, it is not the current rise measurement values MDI1DT, MDI2DT, MDI3DT of the GTO thyristors V11, V21, V31, conducting the currents from the DC link circuit to the load, which are being sensed but instead, as an alternative, the current rise measurement values of the GTO thyristors V12, V22, V32 conducting the currents from the load to the DC link circuit are sensed. This is already indicated in FIG. 1 by the current rise sensing devices 10, 11, 12 which are possible as an alternative.

In the text which follows, the operation of the evaluating electronics for forming extinction blocking signals is described.

Forming an extinction blocking signal is a protective measure in order to counteract the damaging consequences of overcurrents in the GTO thyristors of a static converter. The causes of the overcurrents can be subdivided into three main cases. In the first case (which is overloading), the power section itself of the converter is in order. However, the wrong control of the converter (for example due to inadequate control laws or errors in the control and instrumentation engineering) gives rise to load currents which are too high. In the second case (which is an output short circuit) both the power section and control and instrumentation engineering of the converter are in order. However, the load (motor) or the connecting lines between the converter and the load are faulty. In the third case (which is an internal short circuit), either the power section of the converter is itself defective or a short circuit is produced due to a flashover or due to a control error (both GTO thyristors of one phase are turned on simultaneously). In all three cases, the extinction blocking signal LS must be triggered.

In the case of overloading (first case) and an output short circuit (second case), the overcurrents endangering the GTO thyristors flow through the output current transformers (which are the current sensing devices 13 to 15). It is thus possible in principle to infer the necessity of an activation of the extinction block from the values measured there. In the undisturbed conducting state of the GTO thyristors, the load current and the GTO current (branch current) are equal. The load current can therefore replace the GTO current (branch current) as an input quantity for the predictive extinction block in the two cases of overloading and output short circuit. The first rule is therefore that an extinction blocking signal LS be emitted when the amount of the sum of the actual load current of the phase and the product of its derivation with respect to time (current rise) and the maximum storage time of a GTO thyristor is greater than the permissible turn-off capability of the GTO thyristor. The extinction block is thus activated when iph+diph/dt·TS is greater than ITQ. The slope (derivation or derivative with respect to time) of the load current diph/dt can be obtained, for example, by electronic differentiation (differentiating section 29) from the measurement value of the load current (see FIG. 4 for the alternative). In this connection, the accuracy of the diph/dt signal at, among others, high di/dt values does not need to be very great. The di/dt signal can be both limited and smoothed.

With an internal short circuit (third case), the extinction block must prevent turn-off attempts of the overloaded GTO thyristors until the actual short-circuit detection (short-circuit protection device 25) triggers a crowbar firing. Although the short-circuit protection device 25 is activated by the short-circuit message KM, this must be delayed, filtered and weighted to avoid superfluous crowbar firings. The crowbar firing is therefore delayed. In the case of an internal short circuit, the predictive effect of the extinction block is not needed. The face of the short circuit as such is sufficient triggering criterion. Activation according to the first rule is ineffective in the case of an internal short circuit since the short circuit current does not flow through the output current transformers (current sensing devices 13 to 15). The existing "fast" unfiltered short-circuit message KM is therefore used for triggering the extinction block.

The second rule is therefore that an extinction blocking signal LS is emitted when the unfiltered short-circuit message KM of the phase is present. The short-circuit message is emitted when the actual slope of the branch current, as measured by means of the current rise sensing device of the phase, exceeds a predeterminable threshold value which is basically proportional to the actual link-circuit direct voltage UZK of the converter. Thus, the extinction block is activated when di/dt is greater than UZK·A/LK.

As a rule, only one of the two GTO thyristors is conductive at any given time in one converter phase. It is only in the case of an internal short circuit or of a crowbar firing that both GTO thyristors of one phase conduct simultaneously. In these special cases, both GTO thyristors also require an extinction block at the same time. An extinction blocking signal acting on both GTO thyristors of one phase is therefore sufficient. However, the triggering criteria for the extinction block must be equally suitable for both GTO thyristors of one phase. This is the case with the short-circuit message KM. In the case of the predictive extinction block according to the first rule, this is ensured by the amount formation (amount forming circuit 32).

The third rule is therefore that a single extinction blocking signal LS acts on both GTO thyristors of one bridge phase (phase).

According to the above statements, separate extinction blocking signals LS are produced for each phase 4, 5, 6 in a converter in a three-phase bridge circuit. In this configuration, it is not necessary for all three load current measurement values MIPH1, MIPH2, MIPH3 to be individually sensed. Instead, the measurement of only two load currents and the calculation of the third load current from these two measured load currents according to the relation MIPH1+MIPH2+MIPH3=0 is sufficient.

In the case of traction inverters with asynchronous machines (traction motors) which are used as the load 17, the slope of the load currents diph/dt never exceeds a first or one limit value G1 with a faultless load circuit. This limit value G1 can only be determined from the machine characteristics of the load 17. The load currents of the traction inverter are essentially composed of the "actual" machine currents and the currents through the winding capacitances of the machine when the load circuit is faultless. The slope of the "actual" machine currents is determined by the stray inductance of the machine in connection with the link circuit direct voltage UZK of the converter and the instantaneous EMF (induced electromotive force) of the machine. For example, it may be 5A/µs maximum. The slope of the currents through the winding capacitance of the machine usually does not exceed 5A/µs either. The limit value G1 can thus be selected, for example, as 10A/µs. Since the limit value G1 is so low, the quantity iph+diph/dt·TS needed for the extinction block can be approximately replaced by the quantity iph+G1·TS without reducing the utilization of the converter. Accordingly, the extinction block is activated when iph+G1·TS is greater than ITQ with faultless load circuit and suitable drive, and the load current rise measurement value being replaced by a "worst-case value" G1.

If a fault occurs in the load circuit, that is to say a change in the circuit structure such as a short circuit, for example, the slopes of the load currents diph/dt clearly exceed the limit value G1. In the case of output short circuits or earth or ground leaks, the extinction block can therefore be triggered when diph/dt is greater than a second or other limit value G2, with the limit value G2 being greater than the limit value G1 but being distinctly below the threshold value relevant to the short-circuit protection device 25. A typical limit value G2 is 25A/µs, for example.

In suitable installations, the triggering criterion of the extinction block |MIPH+MDIPH·TS|≧SITQ can thus be replaced by the two criteria |MIPH|≧SITQ−G1·TS and |MDIPHDT|≧G2, both criteria having to be connected in the sense of a logical OR operation.

The advantage of this fourth variant described above lies in that it is simple to implement. An analog processing of the derivation of the load current measurement value is replaced by a threshold value monitoring of this quantity. This reduces the requirements for the quality of the differentiation of the load current measurement values. In addition, the requirement for analog signal processing is advantageously decreased in favor of digital processing.

Figure 5:
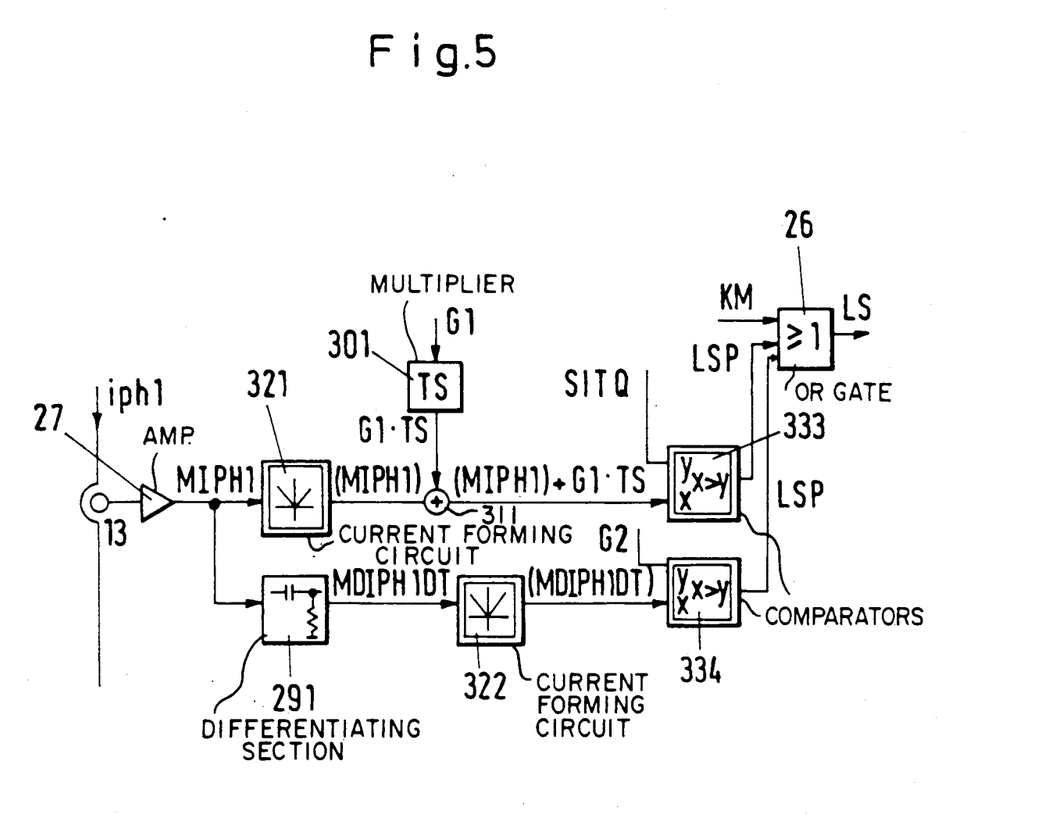

This fourth variant of the evaluating electronics is shown in FIG. ⌒. The addition location 311 receives the amount of the load current measurement value |MIPH1| and the quantity G1·TS, with the amount of the load current measurement value |MIPH1| being formed by means of the configuration of the current sensing device 13, the amplifier 27 and an amount forming circuit 321, and the quantity G1·TS being formed by means of a multiplier 301. The sum |MIPH1|+G1·TS is passed to a comparator 333. The comparator 333 emits a predictive extinction block LSP to the OR gate 26 when the sum |MIPH1|+G1·TS is greater than SITQ.

The load current rise measurement value MDIPH1DT formed from the load current measurement value MIPH1 by means of a differentiating section 291 passes through an amount forming circuit 322 to a comparator 334. The comparator 334 emits a predictive extinction block LSP to the OR gate 26 when the amount MDIPH1DT exceeds the limit value G2. The remaining configuration is as described for FIG. 2.

Figure 6:
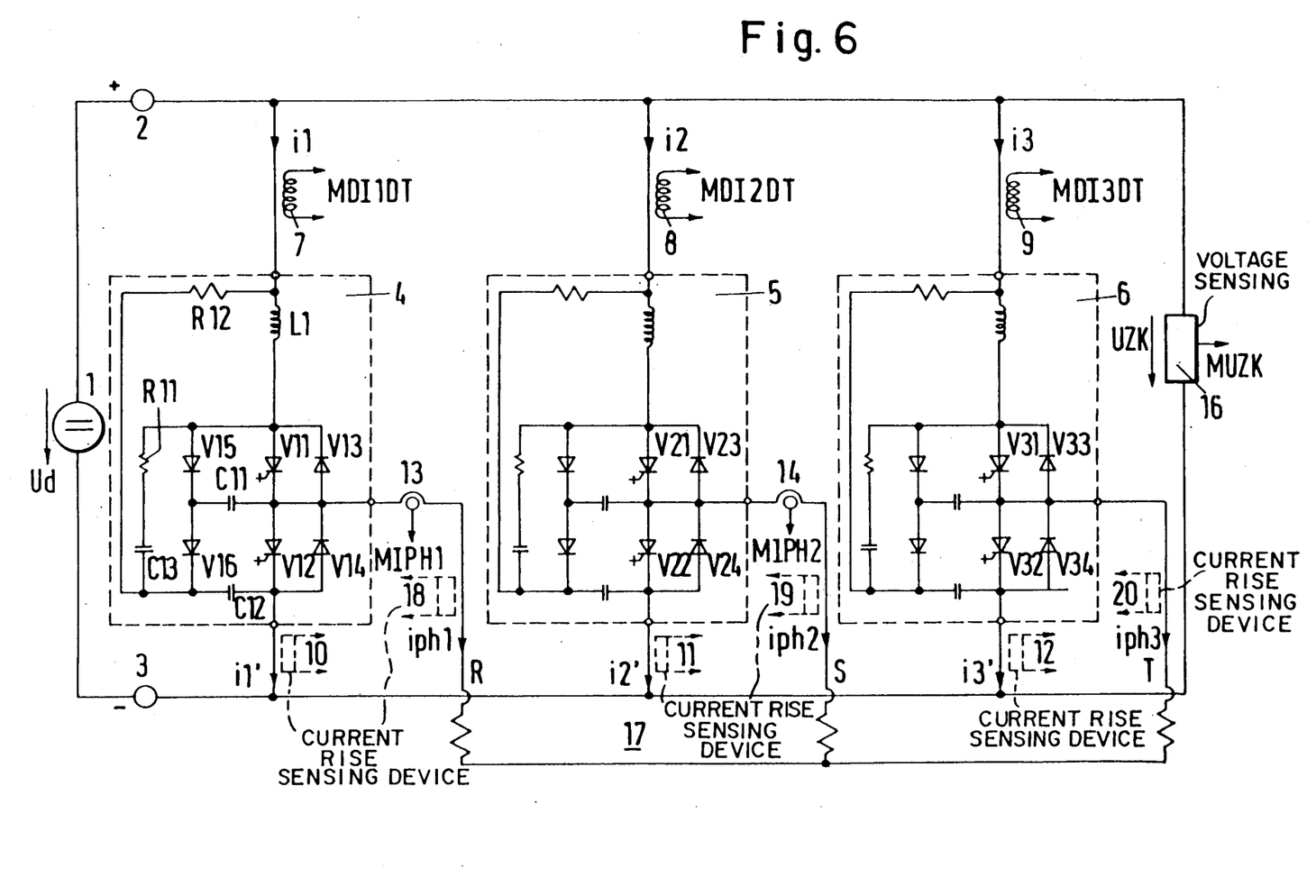
FIG. 6 is a block diagram similar to that of FIG. 1.

As shown in FIG. 6, the current rise sensing device may be omitted, since the value of iph3 may be obtained from iph1 and iph2 according to iph3 = −iph1−iph2. In that case, the load current measurement value MIPH3 is also not necessary.

I claim:

1. Method for forming an extinction blocking signal for gate-turn-off power semiconductors in static converters for suppressing unacceptable extinction attempts, which comprises emitting an extinction blocking signal when the sum of the actual load current of one phase of the static converter and the product of the derivation of the load current with respect to time and the maximum storage time of one power semiconductor is greater than the maximum periodically interruptible anode current of one power semiconductor.

2. Method according to claim 1, which comprises forming the amount of the sum.

3. Method according to claim 1, which comprises inverting the sum in the case of load currents having a direction of flow from a load to the converter.

4. Method according to claim 2, which comprises feeding a single extinction blocking signal to two power semiconductors of one bridge phase of a converter in a bridge circuit.

5. Method according to claim 3, which comprises feeding a single extinction blocking signal to two power semiconductors of one bridge phase of a converter in a bridge circuit.

6. Method according to claim 1, which comprises emitting an extinction blocking signal when the derivation of a branch current of the converter with respect to time exceeds a threshold value proportional to the voltage supplied to the converter and a short circuit of the converter is therefore present.

7. Method according to claim 6, which comprises making the threshold value inversely proportional to the total commutation inductance of one phase of the converter.

8. Method according to claim 1, which comprises utilizing a limit value formed from machine characteristics of a load as a derivation of the load current with respect to time.

9. Method according to claim 8, which comprises emitting an extinction blocking signal when the derivation of the load current with respect to time exceeds another limit value, and the other limit value is greater than the first-mentioned limit value and lower than a threshold value relevant to the short-circuit protection.

10. Device for forming an extinction blocking signal for gate-turn-off power semiconductors in static converters for suppressing unacceptable extinction attempts, comprising a current rise sensing device for a branch current, a voltage sensing device for measuring a link circuit direct voltage, an arithmetic unit connected to said voltage sensing device, and a comparator connected to said current rise sensing device and said arithmetic unit for emitting a short-circuit message when the current rise measurement value exceeds the link circuit direct voltage weighted inversely proportionally to a commutation inductance by said arithmetic unit.

11. Device according to claim 10, wherein the converter has a three-phase bridge circuit, and including two additional current rise sensing devices, only one of said current rise sensing devices being provided in each of the phases.

12. Device according to claim 10, including a current sensing device for measuring a load current measurement value, and another comparator connected to said current sensing device for emitting a predictive extinction block when the sum of the load current measurement value and the product of the corresponding load current rise measurement value with a maximum storage time of one power semi-conductor exceeds a maximum periodically interruptible anode current of one power semiconductor.

13. Device according to claim 11, wherein each phase of the converter includes a current sensing device for measuring a load current measurement value, and another comparator connected to said current sensing device for emitting a predictive extinction block when the sum of the load current measurement value and the product of the corresponding load current rise measurement value with a maximum storage time of one power semi-conductor exceeds a maximum periodically interruptible anode current of one power semiconductor.

14. Device according to claim 12, including a differentiating section connected between said current sensing device and said other comparator for forming the load current rise measurement value from the load current measurement value.

15. Device according to claim 13, wherein each phase of the converter includes a differentiating section connected between said current sensing device and said other comparator for forming the load current rise measurement value from the load current measurement value.

16. Device according to claim 12, including a current rise sensing device connected to said current sensing device for sensing the load current rise measurement value.

17. Device according to claim 13, wherein each phase of the converter includes a current rise sensing device connected to said current sensing device for sensing the load current rise measurement value.

18. Device according to claim 12, including an amount forming circuit for forming the amount of the sum.

19. Device according to claim 13, wherein each phase of the converter includes an amount forming circuit for forming the amount of the sum.

20. Device according to claim 12, including an inverter connected to said current sensing device for providing the sum, and a further comparator connected to said inverter for receiving the sum and emitting a predictive extinction block.

21. Device according to claim 13, wherein each phase of the converter includes an inverter connected to said current sensing device for providing the sum, and a further comparator connected to said inverter for receiving the sum and emitting a predictive extinction block.

22. Device according to claim 12, including an OR gate having inputs and being connected to said comparator and said other comparator for emitting an extinction blocking signal when at least one of the short-circuit message and the predictive extinction block are present at one of the inputs.

23. Device according to claim 13, wherein each phase of the converter includes an OR gate having inputs and being connected to said comparator and said other comparator for emitting an extinction blocking signal when at least one of the short-circuit message and the predictive extinction block are present at one of the inputs.

24. Device according to claim 10, wherein the converter has a three-phase bridge circuit, and including a current sensing device for measuring a load current measurement value, and an additional comparator connected to said current sensing device for emitting a predictive extinction block when the sum of the load current measurement value of one phase of the converter and the product of a limit value and a maximum storage time of one power semiconductor exceeds a maximum periodically interruptible anode current of one power semiconductor.

25. Device according to claim 24, including an added comparator connected to said current sensing device for emitting a predictive extinction block when the load current rise measurement value of one phase of the converter exceeds another limit value.

26. Device according to claim 10, wherein the converter has a three-phase bridge circuit, two phases of the converter each include a current sensing device for measuring two load currents, and a third load current is formed from the two measured load currents.

* * * * *